No. 852,830. PATENTED MAY 7, 1907.
E. EINFELDT.
TRACTION WHEEL.
APPLICATION FILED OCT. 9, 1906.
2 SHEETS—SHEET 2.
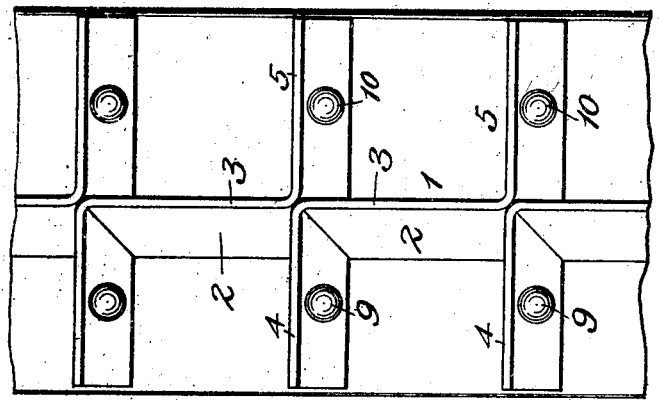
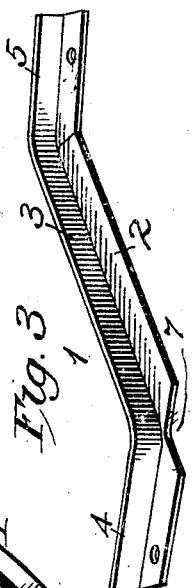
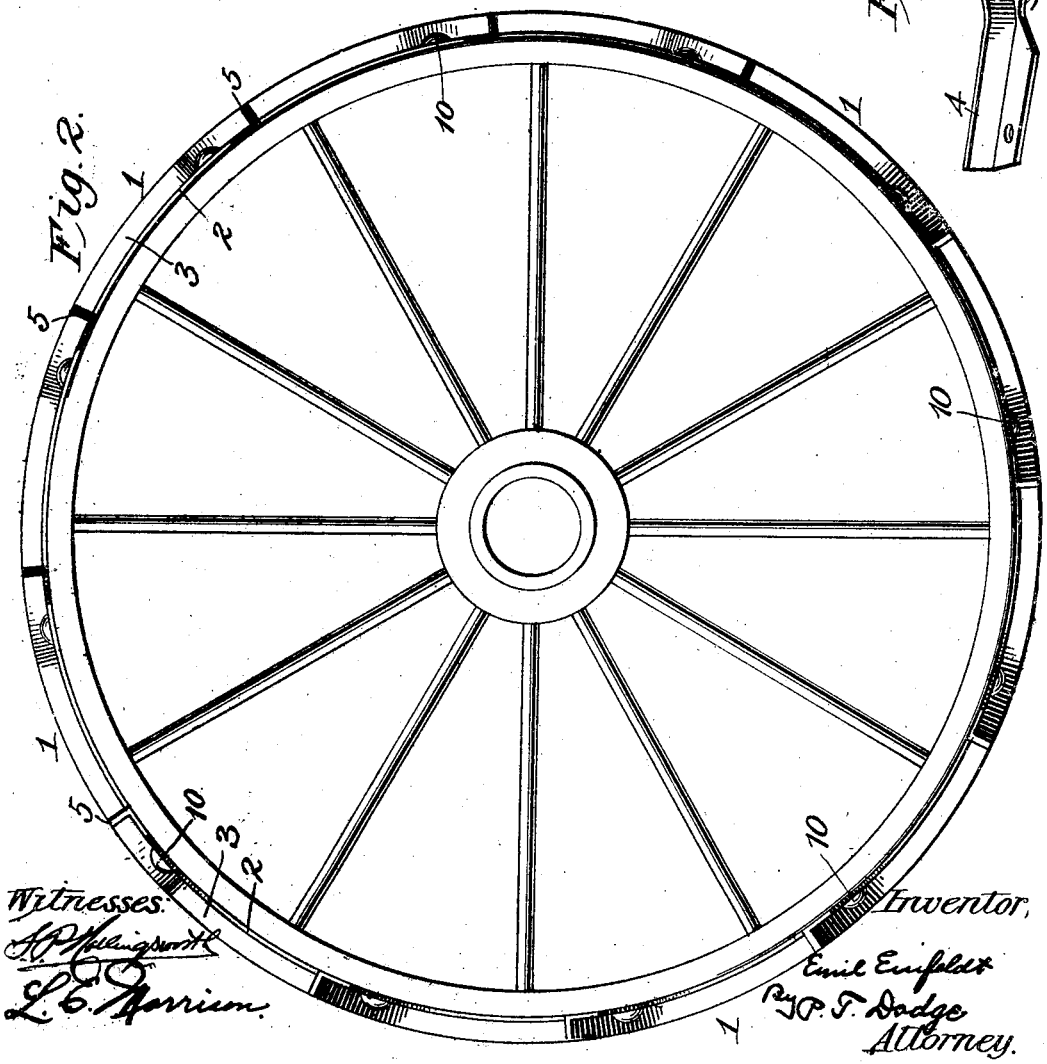

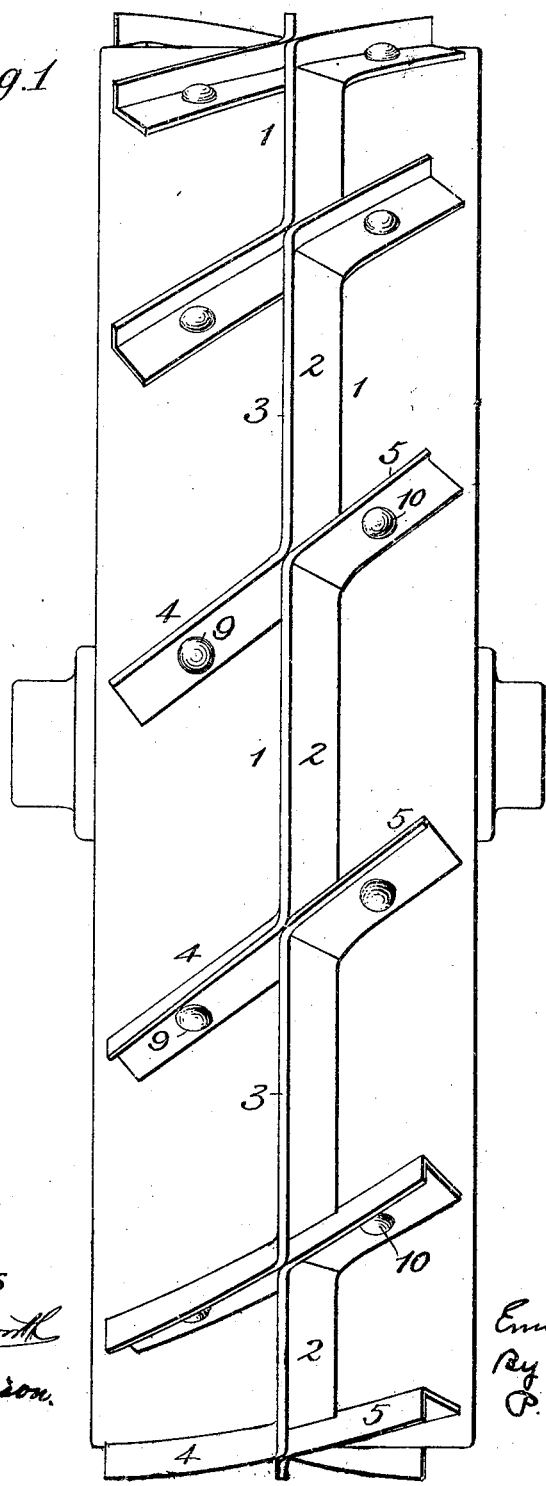

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

TRACTION-WHEEL.

No. 852,830.      Specification of Letters Patent.      Patented May 7, 1907.

Application filed October 9, 1906. Serial No. 338,121.

*To all whom it may concern:*

Be it known that I, EMIL EINFELDT, of Davenport, county of Scott, and State of Iowa, have invented a new and useful Improvement in Traction-Wheels, of which the following is a specification.

This invention relates to traction wheels, and has reference more particularly to the form and manner of application of the traction cleats or lugs to the rim of the wheel.

In certain types of traction wheels, notably grain harvester wheels, it is desirable that the traction ribs or surfaces extend at right angles, or in some cases diagonally to the line of travels, and in addition, it is desirable also that there be a traction rib or surface extending continuously in the line of travel circumferentially around the wheel.

It is the aim of this invention to produce a traction-wheel having the traction ribs or surfaces disposed in the manner described, and the invention consists in a series of complementary traction cleats or elements, each formed with a longitudinally extending traction rib, and with two lateral traction ribs, the former being adapted to conjointly present a continuous rib extending circumferentially around the rim of the wheel, and the lateral ribs being adapted to present conjointly, transversely extending traction surfaces on opposite sides of the longitudinal surface.

By constructing the traction cleats as described, I am enabled to employ in their manufacture, commercial angle-steel, forming each member or element as an integral and continuous structure, the base flange resting flatly on the rim of the wheel and affording a means for fastening the cleat in place, and the vertical flange extending upwardly and forming a traction rib or surface, extending longitudinally and also laterally with reference to the line of travel of the wheel In the accompanying drawings: Figure 1 is a plan view of the traction wheel having my invention applied thereto in its preferred form. Fig. 2 is a side elevation of the same. Fig. 3 is a perspective view of one of the traction cleats or elements. Fig. 4 is a plan view showing the traction cleats in slightly modified form.

Referring to the drawings: 1 represents my improved traction cleats or elements in their preferred form, each being formed from a section or length of commercial angle steel, comprising a base flange 2 and a vertical flange 3. The vertical flange is deflected at its ends in opposite directions diagonally, forming transversely extending traction ribs 4 and 5. The base flange at the points of deflection or bend is incised, with the result that near one end, that where the bend is away from the base flange, the latter will present an open notch 7.

In applying the cleats or members to the rim of the wheel, the base flange is seated flatly thereon, with the intermediate portion of the vertical flange extending longitudinally and in the direction of the line of travel, and with the angle of the vertical flange of each member seated in the notch in the base flange of the next member, so that the intermediate portions of the vertical flanges will extend end to end longitudinally, and will conjointly present a continuous traction rib around the rim of the wheel. The deflected or lateral portion of each cleat will, in conjunction with that of the next cleat, present a transversely extending traction rib disposed on opposite sides of the central continuous rib.

The cleats may be secured to the rim of the wheel in any appropriate manner, either by rivets 9 and 10 extending through the base flanges and through the rim of the wheel, or the metal spokes of the wheel may be extended upward through the rim and base flanges of the cleats, and have their ends headed down thereon.

In Fig. 4 I have represented my invention in slightly modified form. In this case the transverse ribs extend at a true right-angle to the longitudinal continuous rib, whereas in the first instance described, the transverse ribs extended diagonally. The form of the cleat in other respects is the same, and also their mode of application to the rim of the wheel.

Having thus described my invention, what I claim and desire to secure by Letters Patent is:

1. In combination with a wheel rim, traction cleats applied thereto, and each comprising a longitudinally extending traction rib and two oppositely extending transverse ribs, the longitudinal ribs being adapted to conjointly present a continuous traction surface extending in the direction of travel of the wheel, and the transverse rib of one cleat being adapted to form conjointly with the transverse rib of the next cleat, a lateral traction surface extending on opposite sides of the longitudinal surface.

2. In combination with a wheel rim, a series of complementary traction cleats applied thereto and each comprising a longitudinal rib having at opposite ends oppositely extending transverse ribs, the said longitudinal portions of the cleats being placed end to end, with the lateral rib of one cleat forming a continuation of the lateral rib of the next cleat.

3. The improved traction cleat or element, consisting of a length of angle-steel having the base flange incised, and the vertical flange deflected at the point of incision.

4. The improved traction cleat or element, consisting of a length of angle-steel having the base flange incised near its ends, and the vertical flange deflected at opposite ends in opposite directions at the points of incision.

In testimony whereof I hereunto set my hand this twenty eighth day of September, 1906, in the presence of two attesting witnesses.

EMIL EINFELDT.

Witnesses:
M. LOUISE DODGE,
LEON ZOECKLER.